April 16, 1935.  V. F. HAMMEL  1,998,367
METHOD OF MAKING COLUMNAR STRUCTURES
Original Filed April 11, 1931
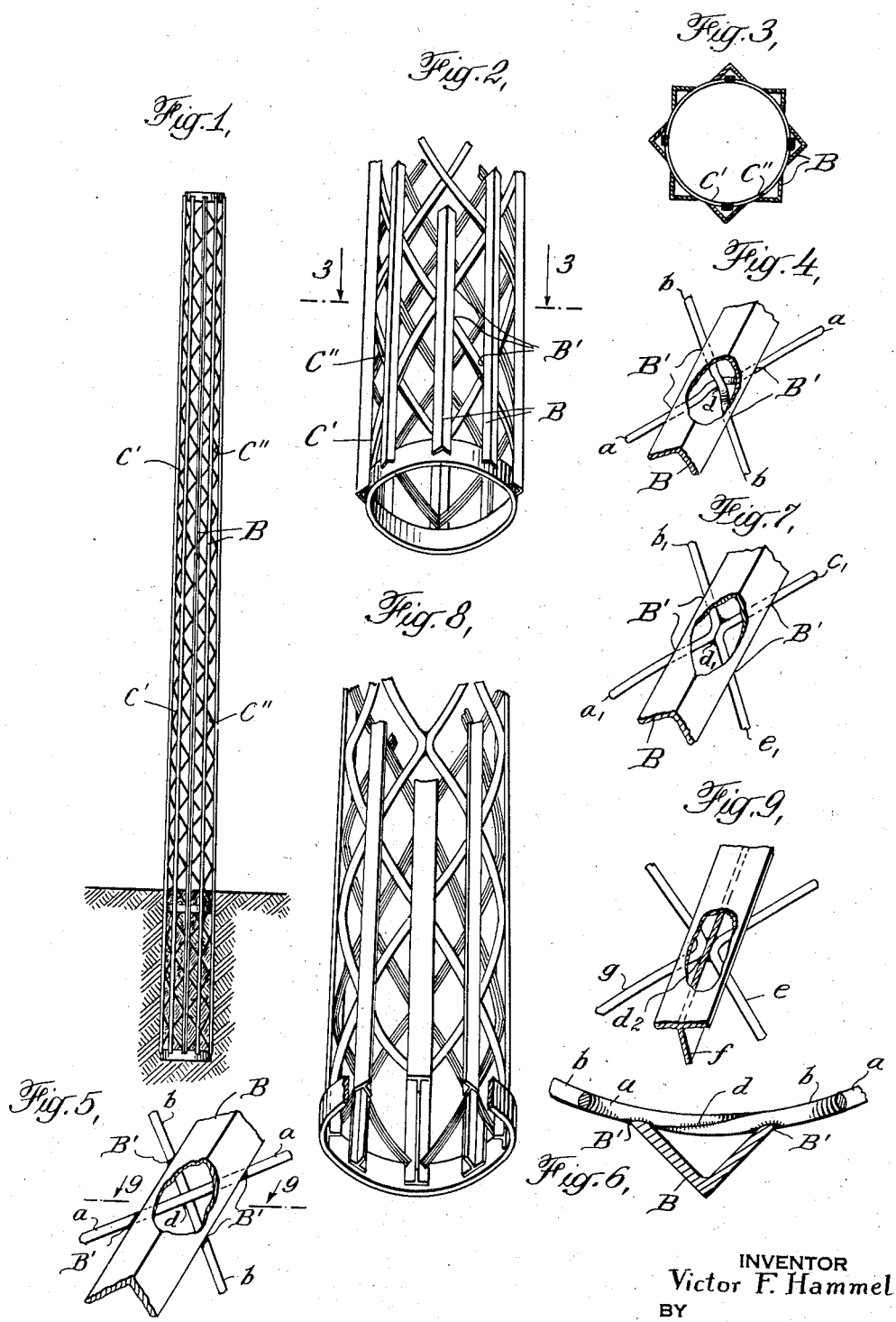
INVENTOR
Victor F. Hammel
BY
Pennie, Davis, Marvin & Edmonds.
ATTORNEYS Patented Apr. 16, 1935

1,998,367

UNITED STATES PATENT OFFICE 1,998,367

METHOD OF MAKING COLUMNAR STRUCTURES

Victor Frank Hammel, Richmond Hills, N. Y.

Original application April 11, 1931, Serial No. 529,407, now Patent No. 1,928,017, dated September 26, 1933. Divided and this application May 26, 1933, Serial No. 672,976

7 Claims. (Cl. 29—155)

This invention pertains to metal pole structures more particularly of the type intended for the support of overhead communication or transmission lines, or as a standard for electric street lamps. More specifically the invention relates to improvements in poles of latticed construction consisting of trussed longitudinal members bound together into an integral structure through the medium of transverse elements.

This application is a division of my copending application Serial No. 529,407, filed April 11th, 1931 issued as Patent No. 1,928,017, September 26, 1933.

In my Patent No. 1,793,928, there is described and claimed a latticed metal pole for purposes stated which combines maximum strength against bending, twisting or compressive stresses, with lightness of weight and facility and economy of construction. The patented structure comprises rods wound in left and right hand intersecting helices together with stiffened or flanged bars extending in alignment with the intersections of said rods, all of the rods and bars being electrically welded together at points of contact.

A pole thus formed is ideally braced against every sort of bending, twisting, compressive or tensile stress. Its strength is thus correspondingly great when acting as a beam, as a column or when subject to torsion.

The trussed longitudinal members have inherent stiffness against bending and being bound together by rods which follow the naturally occurring helically extending lines of compression of a solid or tubular pole sustaining a load, render the pole of maximum strength as a column.

By causing the rods to extend as explained, in accordance with both right and left hand spirals a set of tension members are provided to take up the load regardless of the direction of twist. Thus the torsional strength of the pole is increased since the members are able to withstand without failure much greater loads when acting under tension than under compression.

By electrically welding the longitudinal bars and latticing rods at the points of contact, the strength of the pole is not only increased as compared to the employment of riveted, clamped or bolted joints, but the construction thereof may be accomplished with much greater facility and economy. Where riveted or bolted joints are employed the necessity for punching and aligning the bolt holes, and inserting and capping the bolts is inherently a slower and more expensive procedure than electric welding.

The present invention has for one of its objects the provision of an improved pole in accordance with broad principles of my patent. The modification disclosed herein adds to the features of the patented device, additional advantages applied in novel and unique fashion to the basic structure.

The construction of the improved pole is such that it offers tremendous resistance against earth movement when implanted directly in the ground. The helically wound rods and the longitudinally extending members are so welded together at the intersections as to insure the utmost strength. Artistic simplicity and elegance of design render the completed structure highly acceptable under circumstances which call for ornamentation as well as utility. Poles employed as street lighting standards are illustrative of such use.

It may not always be expedient from a manufacturing standpoint to construct the poles by continuous winding of the latticing rods in helical fashion. Possibly it may prove more feasible, under certain conditions, to utilize latticing members which extend zig-zag or stepped fashion between adjacent longitudinals. In general, however, such construction could not be employed consistent with retention of all of the features of the helically arranged pole of my patent aforesaid.

Accordingly, a second object of the invention is to provide a pole having latticing members of zig-zag or stepped configuration, which, nevertheless, is substantially the mechanical equivalent of my patented structure wherein the latticing is accomplished by winding rods in continuous helical paths.

In the drawing:

Fig. 1 shows in side elevation the improved pole in accordance with this invention which utilizes helically wound rods as latticing elements;

Fig. 2 is a partial perspective view of the pole of Fig. 1 with portions broken away to disclose the construction;

Fig. 3 is a section along the line 3—3 of Fig. 2;

Fig. 4 is a detail of the Fig. 2 construction which discloses one arrangement employed for welding the rods and bars at points of contact. In this showing the rods are slightly kinked at the crossover to permit contact in each instance with the angle bar at the edges thereof;

Figs. 5 and 6 detail a modification in which the intersecting rods are forced by pressure or by pressure combined with electrical fusion thereof into a common surface at the edges of the angle bar to permit welding thereto;

Fig. 7 is a detail which discloses the manner of applying the zig-zag latticing construction to the pole of Fig. 1 in such manner as to retain in substance the advantages of the helically wound latticing;

Fig. 8 depicts in partial perspective a modified form of pole embodying zig-zag latticing, portions being broken away to show the construction in detail; and Fig. 9 details a junction point of the zig-zag and longitudinal members for the structure of Fig. 8.

Referring more particularly to Figs. 1-4, the structure disclosed comprises, rods $C^1$ and $C^{11}$ wound in right and left hand tapering helices, together with angle bars B extending in alignment with the intersections of the rods, all of the rods and bars being electrically welded together at the contact points $B^1$. The rods may or may not be welded to each other at the points on cross-over $d$ (see Fig. 4).

The angle bars are positioned about the helically extending members with their vertices directed outwardly, this particular construction being ideally adapted to prevent shifting or movement of the pole when supported directly in the ground, as shown, for example, in Fig. 1.

Thus referring to Figure 3 it will be apparent that any tendency to produce a lateral shifting of the pole in the ground will cause the earth to become more densely wedged or packed between adjacent angle bars in the direction of shift, thereby greatly increasing the movement resisting action of the pole.

In any movement of the pole in the earth there is an annulus of earth having boundaries comprising the inner and outer radial limits of the angle bars, which moves in conjunction with the pole, producing an increasing resistive action by virtue of the greater frictional resistance between the shell of earth and the surrounding earth. If the entire material enclosed within the annulus mentioned were of steel or wood, the pole would cut through the earth much more readily than with the construction shown, because the coefficient of friction between earth and wood, or between earth and steel is considerably less than that between earth and earth.

Referring to Fig. 4 the oppositely wound or woven latticing rods $a$—$a$ and $b$—$b$ are kinked at the point of cross-over $d$ to permit contact for welding at each of the points $B^1$. In this way the latticing rods and angle bars are all fastened to each other in such manner as to form an integral structure of maximum strength at the joints. The rods $a$—$a$ and $b$—$b$ may or may not be welded together at the point of cross-over $d$.

In the modified construction of Figs. 5 and 6 the rods $a$—$a$ and $b$—$b$ are reduced to a state of fused plasticity adjacent the cross-over by passage of a heavy electrical current through the joint. Coincident with the fusing of the rods, pressure applied to the several elements forces the rods substantially into a common surface of contact at the edges of the bar B and at the point of cross-over $d$. In this way welding is effected between the angle bar B and the rods $a$—$a$ and $b$—$b$ at the four contact points $B'$ and at the cross-over $d$. The fusing at $d$ is such that the rods $a$—$a$ and $b$—$b$ become in effect a single piece of metal of latticed configuration. This not only provides an exceptionally strong joint, but one which is neat and trim of appearance.

It is but a step from the helically arranged fused latticing of Figs. 5 and 6 to the fused zig-zag latticing of Fig. 7. In the latter construction the latticing members $a_1$—$b_1$, and $c_1$—$e_1$ of identical zig-zag configuration are arranged with their vertices opposed. As fusing is accomplished by the passage of current through the contact point $d_1$, the latticing members are pressed together into an integral assembly such that the segment $b_1$—$d_1$ of one latticing member becomes the extension or prolongation of the rectilinear segment $d_1$—$e_1$ of the other latticing members. The angle bar B, as before, extends in alignment with the joints of the latticing members and is welded thereto at the contact points $B^1$.

Accordingly the zig-zag latticing as thus applied becomes in substance the mechanical equivalent of the helical latticing such as disclosed in Figs. 5 and 6. The distinctions between the two constructions reside principally in the method of formation rather than in the result attained.

Figs. 8 and 9 show the zig-zag latticed construction as applied to a pole employing T bars instead of angle bars of the longitudinals. The T bars have their vertical portions directed inwardly to provide a convenient flange, Fig. 9, to which the latticing rods $g$ and $e$ are welded at their vertices $d_2$.

It will be observed that in each of the poles shown, the intersecting rods and bars are so connected that the resulting latticing pattern constitutes a succession of triangles. The triangle as is well understood is the only theoretically non-collapsible plane figure of skeleton construction. It results therefrom that the poles disclosed herein must necessarily utilize the metal most efficiently to the ends of maximum strength consistent with lightness; since not only is the structure considered as a unit ideally braced against every sort of stress, but the elemental portions thereof are so braced as well.

It has been determined practically as a result of numerous tests on poles in accordance with this invention, that due to the ideal trussing employed, it suffices to employ latticing rods of exceptionally small cross-sectional area as compared to that required for the latticing members of skeleton poles in common use.

In the appended claims the terms "helix, helices, etc." are intended to include a true helix of constant generating radius throughout its entire extent as well as a tapered helix wherein the generating radius is variable with length.

I claim:

1. The method of making a columnar structure consisting of latticing rods and flanged bars which comprises, winding said rods in left and right hand intersecting helices, opposing to said rods on each side of a line of intersections thereof, respective flanges of a bar aforesaid, and welding each rod to the flange opposed thereto.

2. The method of making a columnar structure consisting of latticing rods and flanged bars which comprises, winding said rods in left and right hand intersecting helices, opposing to said rods on each side of a line of intersections thereof, respective flanges of a bar aforesaid, forcing each rod into contact with the flange opposed thereto and welding said rod to said flange thereat.

3. The method of making a columnar structure consisting of latticing rods and flanged bars which comprises, winding said rods in left and right hand intersecting helices, welding said rods to each other at points of intersection, opposing to said rods on each side of a line of intersections thereof, respective flanges of a bar aforesaid, and welding each rod to the flange opposed thereto.

4. The method of making a columnar structure consisting of latticing rods and flanged bars which comprises, winding said rods in left and right hand intersecting helices, opposing to said rods on each side of a line of intersections thereof, respective flanges of a bar aforesaid, electrically heating said rods to plasticity at said intersections, forcing each said rod at each intersection while in said plastic state into contact with the flange opposed thereto, and welding said rod to said flange thereat.

5. The method of making a hollow metal pole or column consisting of oppositely wound latticing rods and longitudinal angle bars, which comprises, opposing to said rods on each side of a line of intersections thereof the respective flanges of an angle bar aforesaid, electrically heating said rods to plasticity at said points of intersection, forcing each said rod at an intersection while in said plastic state into contact with the flange opposed thereto, and welding said rods and bars thereat.

6. The method of making a cylindrical pole consisting of stiffened longitudinal bars and transverse latticing rods, which consists in winding said rods in left and right hand intersecting helices, electrically heating said rods to plasticity at points of intersection, forcing said left and right hand helically extending rods while in said plastic state substantially into a common cylindrical surface by pressure exerted at said intersections, and welding said stiffened bars to said latticing rods in alignment with the intersections thereof.

7. The method of making a columnar structure consisting of latticing rods and longitudinal angle bars which comprises winding said rods in left and right hand intersecting helices, opposing to said rods on each side of a line of intersections thereof, the respective flanges of an angle bar, kinking said rods at their places of intersection so that each rod adjacent an intersection will be in contact with both flanges of an angle bar, and welding each rod to the flanges opposed thereto.

VICTOR FRANK HAMMEL.